United States Patent
Honda et al.

(10) Patent No.: US 6,942,825 B2
(45) Date of Patent: Sep. 13, 2005

(54) SILVER COMPOUND PASTE

(75) Inventors: Toshiyuki Honda, Fujimi (JP); Kouji Okamoto, Saitama (JP); Masafumi Ito, Tokyo (JP); Masanori Endo, Tokyo (JP); Katsuhiko Takahashi, Sakura (JP)

(73) Assignees: Fujikura Kasei Co., Ltd., Tokyo (JP); Fujikura Ltd., Tokyo (JP)

( * ) Notice: Subject to any disclaimer, the term of this patent is extended or adjusted under 35 U.S.C. 154(b) by 0 days.

(21) Appl. No.: 10/493,999

(22) PCT Filed: Oct. 31, 2002

(86) PCT No.: PCT/JP02/11394

§ 371 (c)(1),
(2), (4) Date: Apr. 27, 2004

(87) PCT Pub. No.: WO03/038838

PCT Pub. Date: May 8, 2003

(65) Prior Publication Data

US 2004/0248998 A1 Dec. 9, 2004

(30) Foreign Application Priority Data

Oct. 31, 2001 (JP) ........................................ 2001-335675
Apr. 12, 2002 (JP) ........................................ 2002-111022

(51) Int. Cl.[7] .................................................. H01B 1/20
(52) U.S. Cl. ..................................................... 252/520.3
(58) Field of Search ............................... 252/514, 520.3

(56) References Cited

FOREIGN PATENT DOCUMENTS

| JP | 63-278983 | 11/1988 | ........... C09D/11/00 |
|---|---|---|---|
| JP | 3-155004 | 7/1991 | ............ H01B/1/20 |
| JP | 5-311103 | 11/1993 | ........... C09D/11/02 |
| JP | 2003-309337 | * 10/2003 | |

* cited by examiner

*Primary Examiner*—Mark Kopec
(74) *Attorney, Agent, or Firm*—Grossman, Tucker, Perreault & Pfleger, PLLC

(57) ABSTRACT

An object of the present invention is to provide a silver compound paste which can be easily applied without containing resin, and which produces a conductive film having a low electric resistivity by heating under conditions substantially equivalent to those in a conductive film containing a polymer type conductive paste. The present invention provides a silver compound paste containing silver oxide particles and a tertiary fatty acid silver salt.

3 Claims, No Drawings

SILVER COMPOUND PASTE

TECHNICAL FIELD

The present invention relates to a silver compound paste for a conductive film.

BACKGROUND ART

A conductive paste is a paste in which metal particles which are conductive are dispersed in a resin, etc. Since silver powder is highly electrically conductive and resists oxidation, silver powder is commonly used as the conductive material.

The conductive pastes are mainly classified into firing type conductive pastes and polymer type conductive pastes. The firing type conductive pastes develop conductivity by heating to about 500 to 900° C., and thereby metal particles are sintered to each other and a continuous conductive layer can be obtained. The polymer type conductive paste contains resin, in order to improve coating properties, dispersing properties of metal particles, and adhesion to a substrate. When the polymer type conductive paste is heated from about room temperature to 200° C., the resin is cured. The resin is cured and the metal particles are contacted to each other at the same time, a continuous conductive film is prepared and conductivity is thereby established. Since the polymer type conductive paste is heated to a temperature lower than that in the firing type conductive paste, and this requires energy for preparing a conductive film, which is lower than that in the firing type conductive paste, the polymer type conductive paste can reduce the production cost of a conductive film.

However, since the polymer type conductive paste contains resin, when this is heated and cured, resin, which is an insulating material, intervenes between metal particles, and metal particles cannot be sintered to each other, and it is thereby impossible to sufficiently decrease electrical resistance of the conductive film. In addition, when resin is not contained in the conductive paste, a conductive paste having a sufficient viscosity for coating easily cannot be obtained.

In consideration of the above-described problems, an object of the present invention is to provide a silver compound paste which is easily applied even if no resin is contained, and in which metal particles are sintered and continuously even if it is heated to a temperature substantially equal to a temperature in the polymer type conductive paste, and which can produce a conductive film having a low electric resistivity.

DISCLOSURE OF INVENTION

The silver compound paste of the present invention contains silver oxide particles and a tertiary fatty acid silver salt.

A tertiary fatty acid silver salt functions as a lubricant. When silver oxide and a tertiary fatty acid silver salt are kneaded and a paste is obtained, a tertiary fatty acid silver salt crushes silver oxide and promotes fineness of the silver oxide, that is, a tertiary fatty acid silver salt makes the particle size of silver oxide be 500 nm or less. In addition, a tertiary fatty acid silver salt makes the dispersing condition of silver oxide fine particles stable. As a result, the silver compound paste of the present invention becomes a paste having a viscosity which is easily applied even if it contains no resin. When the silver compound paste is heated, silver oxide produces a self-reduction reaction and silver particles are formed. In addition, a tertiary fatty acid silver salt is decomposed, and silver is deposited. The deposited silver forms silver particles due to silver oxide being adhered or bonded, and thereby a silver film, which is a conductive film, is prepared. Since, the prepared silver film contains no insulating material such as resin between silver particles, and silver particles are adhered in the prepared silver film, an electric resistivity thereof is low.

In the silver compound paste, it is preferable for the weight ratio (A/B) between the weight A of the silver oxide and the weight B of the tertiary fatty acid silver salt to be in a range from 1/4 to 3/1.

When the weight ratio (A/B) between the weight A of the silver oxide and the weight B of the tertiary fatty acid silver salt is in a range from 1/4 to 3/1, the particle size of silver oxide becomes 500 nm or less, and silver oxide is sufficiently dispersed. Due to this, the silver compound paste has a viscosity which achieves easy coating. A silver film, which is prepared by heating the silver compound paste, has an electric resistivity, which is much lower than that of the conductive film made by a conventional polymer type conductive paste.

MODES FOR CARRYING OUT THE INVENTION

The silver compound paste of the present invention contains silver oxide ($Ag_2O$) particles or a granular silver oxide ($Ag_2O$) and a tertiary fatty acid silver salt.

There is no limitation on the fine silver oxide particles contained in the silver compound paste, but the particle diameter is preferably 500 nm or less. When the particle diameter is 500 nm or less, the self-reduction reaction occurs at lower temperature. As a result, the conductive silver film can be prepared at lower temperature. The fine silver oxide particles having a particle diameter in this range may be used as a raw material and may be mixed, but a control of dispersing stability is difficult. The silver oxide coarse particles are crushed and made finer, that is, the particle diameter of the silver oxide coarse particles is adjusted to 500 nm or less, during production process of the silver compound paste, by adding a tertiary fatty acid silver salt as a lubricant. In this case, silver oxide coarse particles, which can be commonly obtained, are used as the silver oxide coarse particles.

A tertiary fatty acid silver salt is a silver salt of tertiary fatty acid having 5 to 30 carbons. A tertiary fatty acid silver salt works as a lubricant. When silver oxide and the tertiary fatty acid silver salt are kneaded and a paste is prepared, a tertiary fatty acid silver salt facilitates crushing and making silver oxide fine, and simultaneously, this is present around the silver oxide particles and prevents re-cohesion of silver oxide particles, and this thereby improves dispersibility. Due to this, it is possible to disperse silver oxide and make a paste without containing resin.

When a tertiary fatty acid silver salt is heated, this is decomposed and silver thereby is deposited. The deposited silver bonds silver particles which are prepared by the reduction reaction of silver oxide.

A tertiary fatty acid silver salt can be prepared by the following method. First, tertiary fatty acid is neutralized with an alkali compound and sodium salt of tertiary fatty acid is prepared. Then, when silver nitrate is added to sodium salt of tertiary fatty acid, a tertiary fatty acid silver salt is prepared.

Examples of a tertiary fatty acid include pivalic acid, neoheptanoic acid, neononanoic acid, neodecanoic acid, EQUACID® 13 (marketed by Idemitsu Petrochemical Co. Ltd.) etc.

Among these tertiary fatty acids, tertiary fatty acid having 10 or more carbons is preferable. A tertiary fatty acid having 10 or more carbons is decomposed at lower temperature. Bonding silver particles, which are prepared from silver oxide, is further promoted. Examples of the tertiary fatty acid include neodecanoic acid, EQUACID® 13, etc.

When the weight of silver oxide is denoted by "A" and the weight of a tertiary fatty acid silver salt is denoted by "B", the weight ratio (A/B) between silver oxide and a tertiary fatty acid silver salt in the silver compound paste is preferably in a range from 1/4 to 3/1. If the weight ratio is less than 1/4, the amount of silver oxide is insufficient relative to the amount of a tertiary fatty acid silver salt, an interaction between silver oxide particles is insufficient. As a result, since thixotropy of the silver compound paste decreases, a resolution during coating decreases. In addition, there is a case in which the thickness of silver film after heating is insufficient. Here, a "resolution" means a displacement between an original pattern image for coating and a pattern image after the paste is coated or after the paste is coated and hardened. A paste having a low resolution cannot reproduce the original pattern image satisfactorily. In contrast, if the weight ratio exceeds 3/1, the amount of a tertiary fatty acid silver salt is insufficient relative to the amount of silver oxide, and there is a case in which silver oxide is not readily dispersed stably in a fine particle state. When a paste, in which silver oxide is not sufficiently dispersed, is heated, there is a case in which a reduction reaction of silver oxide is slow, and an electric resistivity decreases sufficiently.

The silver compound paste contains a solvent other than silver oxide and a tertiary fatty acid silver salt. The solvent is not limited as long as it does not react with either of silver oxide and a tertiary fatty acid silver salt and it can disperse both silver oxide and a tertiary fatty acid silver salt.

A solvent may not dissolve a tertiary fatty acid silver salt. A solvent, which improves paste applying workability based on a boiling point, an evaporation rate of the solvent, and a rheology of the silver compound paste, and wettability to object on which it is to be applied, is preferable.

The amount of a solvent is not limited, but this is preferably in a range which is suitable for paste applying workability, heating conditions explained below, etc.

The method for producing the silver compound paste is not limited as long as it can make a paste by kneading silver oxide, a tertiary fatty acid silver salt, and a solvent. For example, the silver compound paste can be prepared by mixing silver oxide, a tertiary fatty acid silver salt, and a solvent, and these are then kneaded using a roll mill. During kneading, coarse silver oxide particles are crushed. The particle diameter of the crushed silver oxide particles is preferably 500 nm or less, as explained above.

In order to produce a silver film, which is a conductive film, using the silver compound paste, it is preferable that the silver compound paste be coated on a substrate, and that this be heated to from 150 to 250° C. Silver oxide fine particles having a particle diameter of 500 nm or less before heating produce a self-reduction reaction by heating, and oxygen is released, and metal silver particles are thereby produced. Neighboring metal silver particles are adhered by silver deposited by the decomposition reaction of a tertiary fatty acid silver salt, which occurs at the same time of the self-reduction reaction. Finally, a continuous silver film having high conductivity is prepared. The process, in which the silver film is produced by silver oxide and a tertiary fatty acid silver salt, can be observed by a scanning electron microscope (SEM).

Conductivity of the silver film produced by the silver compound paste is influenced by the heating conditions. For example, when a heating temperature is high, since sintering of the silver particles are promoted, an electric resistivity decreases. When a heating time is long, since the amount of sintered silver particles increases, an electric resistivity also decreases. Therefore, heating is preferably conducted at high temperature and for a long time to decrease an electric resistivity of the silver film.

A substrate, on which the silver compound paste is applied, is not limited as long as the silver film produced by the silver compound paste is sintered closely on the substrate, and the substrate withstands the heating conditions. Examples of a substrate include a copper plate, a copper foil, resin plates such as a glass-epoxy, etc.

A conductive film having a low electric resistivity is produced by coating the silver compound paste on the substrate and heating the paste.

When a conductive film cannot be produced directly on the substrate for the reason that the substrate cannot withstand the heating temperature, etc., after the silver film is produced on a substrate having excellent releasing property and high heat resistance, the silver film is transferred on a desired substrate by a dry-lamination method, etc.

Below, the silver compound paste of the present invention will be explained with reference to Examples.

EXAMPLES

Effects of Silver Oxide and a Tertiary Fatty Acid Silver Salt

In Examples 1 and Comparative Examples 1 and 2, effects of silver oxide and a tertiary fatty acid silver salt were examined.

Example 1

In isophorone, which is a solvent, silver oxide (marketed by Kojima Chemical Reagents Inc.) and silver neodecanoate, which is a tertiary fatty acid silver salt, were added such that weight ratio between silver oxide and silver neodecanoate is 4.0 to 3.0. After kneading the mixture using a roll mill, a silver compound paste was prepared. Viscosity of the prepared silver compound paste was measured, and thixotropy was examined. In addition, the prepared silver compound paste was coated on glass plates, and the glass plates were heated for 30 minutes at 150° C., 200° C., and 250° C., and the silver films were thereby prepared. An electric resistivity of the silver films was measured. The results are shown in Table 1.

Comparative Example 1

A comparative silver paste and a conductive silver film were prepared in a manner identical to that of Example 1 of the present invention, except that silver neodecanoate was not added. Thixotropy and an electric resistivity were examined. The results are also shown in Table 1.

Comparative Example 2

A comparative silver paste and a conductive silver film were prepared in a manner identical to that of Example 1 of the present invention, except that silver oxide was not added. Thixotropy and an electric resistivity were examined. The results are also shown in Table 1.

TABLE 1

|  | Example 1 | Comparative Example 1 | Comparative Example 2 |
|---|---|---|---|
| Silver neodecanoate | Added | None | Added |
| Silver oxide | Added | Added | None |
| Thixotropy | Middle class | Low class | Low class |
| Electric resistivity ($\times 10^{-6} \Omega \cdot cm$) |  |  |  |
| Heating conditions At 250° C. for 30 minutes | 2.81 | — | 4.14 |
| At 200° C. for 30 minutes | 3.51 | 76.0 | — |
| At 150° C. for 30 minutes | 5.31 | 31.1 | — |

In Table 1, "—" denotes a measurement could not be conducted because an electric resistivity was extremely high.

Since the silver compound paste of Example 1 contained silver oxide and silver neodecanoate, which is a tertiary fatty acid silver salt, the silver compound paste had thixotropy suitable for coating. When the silver compound paste of Example 1 was heated at 250° C. for 30 minutes, the conductive silver film having an extremely low electric resistivity, $2.81 \times 10^{-6} \Omega \cdot cm$, was produced.

In contrast, in Comparative Example 1, since the paste did not contain silver neodecanoate, which is a tertiary fatty acid silver salt, thixotropy of the paste was low, and the conductive silver film made of the paste had high an electric resistivity.

In Comparative Example 2, since the paste did not contain silver oxide, thixotropy of the paste was low, and the thickness of the conductive silver film made of the paste was not uniform. The electric resistivity of the conductive silver film was sufficiently low, but the resolution was low and a uniform pattern could not be produced.

Silver Organic Acids Other than a Tertiary Fatty Acid Silver Salt

In the following Comparative Examples 3 and 4, the paste and the conductive silver film, which contain primary and secondary fatty acid silver salts other than a tertiary fatty acid silver salt, were examined.

Comparative Example 3

A comparative silver paste and a conductive silver film were prepared in a manner identical to that of Example 1 of the present invention, except that silver 2-ethylhexanoate, which is a secondary fatty acid silver salt, was used instead of silver neodecanoate. Solubility of silver organic acid, thixotropy, and an electric resistivity were examined. The results are shown in Table 2.

Comparative Example 4

A comparative silver paste and a conductive silver film were prepared in a manner identical to that of Example 1 of the present invention, except that silver 3,5,5-trimethylhexanoate, which is a primary fatty acid silver salt, was used instead of silver neodecanoate. Solubility of silver organic acid, thixotropy, and an electric resistivity were examined. The results are shown in Table 2.

TABLE 2

|  | Comparative Example 3 | Comparative Example 4 |
|---|---|---|
| Fatty acid silver salt | Silver 2-ethylhexanoate | Silver 3,5,5-trimethyhexanoate |
| Solubility of fatty acid silver salt | Middle class | Middle class |
| Thixotropy | High class | High class |
| Electric resistivity ($\times 10^{-6} \Omega \cdot cm$) |  |  |
| Heating conditions At 250° C. for 30 minutes | — | — |
| At 200° C. for 30 minutes | — | — |
| At 150° C. for 30 minutes | — | — |

In Table 2, "—" denotes a measurement could not be conducted because a continuous film could not be prepared.

Silver 2-ethylhexanoate, which is a secondary fatty acid silver salt, was used instead of silver neodecanoate in Comparative Example 3, and silver 3,5,5-trimethylhexanoate, which is a primary fatty acid silver salt, was used instead of silver neodecanoate in Comparative Example 4. Therefore, dispersibility of silver oxide was low and silver oxide was made insufficiently fine and dispersed, and thixotropy of the pastes thereby was high. In addition, since a decomposition temperature of organic acid silver salts themselves is high, a continuous silver film could not be prepared in both Comparative Examples 3 and 4.

Effects of Solvent

In the following Examples 2 to 8, effects of solvents were examined.

Examples 2 to 8

Silver compound pastes were prepared in a manner identical to that of Example 1 of the present invention, except that solvents shown in Table 3 were used. Then, solubility of silver neodecanoate, thixotropy of the silver compound paste, and an electric resistivity of the silver film prepared using the silver compound paste were examined. The results are shown in Table 3.

Since solvents used in Examples 2 to 8 have different abilities to dissolve silver neodecanoate, the difference in solubility affects thixotropy of the silver compound pastes. That is, thixotropy was moderately low in the silver compound paste containing isophorone or terpineol, in which silver neodecanoate has high solubility. In contrast, thixotropy of the silver compound paste containing triethylene glycol monobutyl ether (TEGBE) or butyl cellosolve acetate (BCA) was high. Thixotropy of the silver compound paste influences coating properties. The silver compound pastes in Examples 2 to 8 had sufficient coating properties.

In addition, an electric resistivity of the silver film, which was made of the silver compound paste of Examples 2 to 8, is sufficiently low. Influences of the solvent could not be confirmed practically.

TABLE 3

|  | Example 1 | Example 2 | Example 3 | Example 4 | Example 5 | Example 6 | Example 7 | Example 8 |
|---|---|---|---|---|---|---|---|---|
| Solvent | Isophorone | terpineol | diglyme | cyclohexanone | butyl cellosolve | PGBE *1 | TEGBE *2 | BCA *3 |
| Solubility of silver neodecanoate | High class | High class | Middle class | Middle class | Middle class | Middle class | Low class | Low class |
| Thixotropy | Middle class | Middle class | High class | High class | High class | High class | High class | High class |
| Electric resistivity ($\times 10^{-6} \Omega \cdot cm$) | | | | | | | | |
| Heating conditions At 250° C. for 30 minutes | 2.81 | 2.92 | 2.64 | 2.84 | 2.71 | 2.46 | 5.95 | 2.63 |
| At 200° C. for 30 minutes | 3.51 | 4.14 | 3.80 | 4.49 | 3.73 | 3.57 | 4.20 | 4.51 |
| At 150° C. for 30 minutes | 5.31 | 5.84 | 5.24 | 5.38 | 4.74 | 7.57 | 6.56 | 5.23 |

In Table 3, PGBE *1 denotes propylene glycol monobutyl ether, TEGBE *2 denotes triethylene glycol monobutyl ether, and BCA *3 denotes butyl cellosolve acetate.

Effects of the weight ratio between silver oxide and a tertiary fatty acid silver salt In the following Examples 9 to 13, effects of the weight ratio between silver oxide and a tertiary fatty acid silver salt were examined.

Example 9

A silver compound paste was prepared in a manner identical to that of Example 1 of the present invention, except that the weight ratio of silver oxide (marketed by Kojima Chemical Reagents Inc.) and silver neodecanoate was 4.0 to 16.0. Then, thixotropy of the silver compound paste, and an electric resistivity of the silver film prepared using the silver compound paste were examined. The results are shown in Table 4.

Example 10

A silver compound paste was prepared in a manner identical to that of Example 1 of the present invention, except that the weight ratio of silver oxide (marketed by Kojima Chemical Reagents Inc.) and silver neodecanoate was 4.0 to 4.0. Then, thixotropy of the silver compound paste, and an electric resistivity of the silver film prepared using the silver compound paste were examined. The results are shown in Table 4.

Example 11

A silver compound paste was prepared in a manner identical to that of Example 1 of the present invention, except that the weight ratio of silver oxide (marketed by Kojima Chemical Reagents Inc.) and silver neodecanoate was 4.0 to 2.0. Then, thixotropy of the silver compound paste, and an electric resistivity of the silver film prepared using the silver compound paste were examined. The results are shown in Table 4.

Example 12

A silver compound paste was prepared in a manner identical to that of Example 1 of the present invention, except that the weight ratio of silver oxide (marketed by Kojima Chemical Reagents Inc.) and silver neodecanoate was 4.0 to 1.3. Then, thixotropy of the silver compound paste, and an electric resistivity of the silver film prepared using the silver compound paste were examined. The results are shown in Table 4.

Example 13

A silver compound paste was prepared in a manner identical to that of Example 1 of the present invention, except that the weight ratio of silver oxide (marketed by Kojima Chemical Reagents Inc.) and silver neodecanoate was 4.0 to 1.0. Then, thixotropy of the silver compound paste, and an electric resistivity of the silver film prepared using the silver compound paste were examined. The results are shown in Table 4.

TABLE 4

|  | Example 9 | Example 10 | Example 11 | Example 12 | Example 13 |
|---|---|---|---|---|---|
| Weight ratio of silver oxide and fatty acid silver salt (silver oxide/fatty acid silver salt) | 4/16.0 | 4/4.0 | 4/2.0 | 4/1.3 | 4/1.0 |
| Thixotropy | Low class | Middle class | Middle class | Middle class | Middle class |
| Electric resistivity ($\times 10^{-6} \Omega \cdot cm$) | | | | | |
| Heating conditions At 250° C. for 30 minutes | 2.37 | 2.68 | 2.75 | 3.08 | — |
| At 200° C. for 30 minutes | 3.41 | 3.21 | 4.19 | 4.22 | 11.80 |
| At 150° C. for 30 minutes | 6.02 | 4.46 | 6.31 | 6.47 | 8.38 |

In Table 4, "—" denotes a measurement could not be conducted because an electric resistivity was extremely high.

In Examples 9 to 12, since the amount of silver neodecanoate, which works as a lubricant, is sufficient relative to the amount of silver oxide, silver oxide is made into fine particles and they are dispersed, and thereby an electric resistivity of the prepared silver film was low.

Thixotropy of the silver compound paste of Example 9 was low, but the silver compound paste could be sufficiently practically used.

The silver film of Example 13 could be used sufficiently, but the amount of silver neodecanoate was slightly insufficient an electric resistivity of the silver film was slightly higher compared with an electric resistivity of the silver films of Examples 9 to 12.

Effects of Heating Temperature and Heating Time

As references, effects of heating temperature and heating time were examined.

An electric resistivity of the silver film after heating, specifically, after heating for 10 minutes, 20 minutes and 30 minutes at 200° C. and 250° C., in Examples 1 and 6, was measured. The results are shown in Table 5. In Table 5, the results in Examples 1 and 6 are shown respectively as Experiments 1 and 2.

In both Experiments 1 and 2, an electric resistivity further decreases when heating temperature was higher. However, the decreased electric resistivity was not large in practical use. Therefore, excess heating temperature increases the energy cost for producing a silver film. In addition, when the heating time was longer, the electric resistivity was not always smaller. The inventors believe that the production of the silver film is almost completed by heating for 10 minutes. Therefore, excess heating time decreases productivity of the silver film.

TABLE 5

|  |  | Experiment 1 | | Experiment 2 | |
|---|---|---|---|---|---|
| Solvent | | isophorone | | PGBE | |
| Hardening temperature (° C.) | | 200 | 250 | 200 | 250 |
| Electric resistivity ($\times 10^{-6} \Omega \cdot$ cm) | | | | | |
| Heating | 10 minutes | 3.40 | 3.63 | 3.03 | 3.23 |
| conditions | 20 minutes | 3.67 | 2.93 | 2.67 | 2.41 |
|  | 30 minutes | 3.51 | 2.81 | 3.57 | 2.46 |

INDUSTRIAL APPLICABILITY

According to the present invention, although the silver compound paste does not contain resin, the paste can be easily applied. In addition, in the silver film produced by the silver compound paste of the present invention, an insulating material such as resin does not intervene between prepared silver particles. In addition, since the prepared silver particles are sintered, and a continuous silver film can be prepared, an electric resistivity of the silver film is extremely low. Furthermore, since heating conditions for producing the silver film are substantially equivalent to heating conditions for producing a silver film using polymer type conductive paste, workability is also excellent.

We claim:

1. A silver compound paste containing silver oxide particles and a tertiary fatty acid silver salt.

2. A silver compound paste according to claim 1, wherein the weight ratio (A/B) between the weight A of silver oxide and the weight B of the tertiary fatty acid silver salt is in a range from 1/4 to 3/1.

3. A silver compound paste according to claim 1, wherein the tertiary fatty acid silver salt has 10 or more carbons.

* * * * *